United States Patent [19]
Ettelt

[11] 3,932,282
[45] Jan. 13, 1976

[54] DISSOLVED AIR FLOATATION SYSTEM

[75] Inventor: Gregory A. Ettelt, Berwyn, Ill.

[73] Assignee: Tenco Hydro/Aerosciences, Inc., Countryside, Ill.

[22] Filed: Aug. 6, 1974

[21] Appl. No.: 495,229

Related U.S. Application Data

[63] Continuation of Ser. No. 286,220, Sept. 5, 1972, abandoned.

[52] U.S. Cl. ............... 210/195; 210/221; 210/320
[51] Int. Cl.² ..................... B01D 17/00; B03D 1/00
[58] Field of Search .......... 209/170; 210/42, 44, 45, 210/51, 66, 67, 96, 97, 104, 112, 115, 220, 221, 247, 248, 305, 320, 532, 533, 194–197

[56] References Cited
UNITED STATES PATENTS

| | | | |
|---|---|---|---|
| 1,717,223 | 6/1929 | Karlstrom | 210/44 |
| 2,793,185 | 5/1957 | Albrektsson et al. | 210/44 |
| 3,072,261 | 1/1963 | Smith | 210/532 |
| 3,192,155 | 6/1965 | Bready et al. | 210/221 X |
| 3,418,236 | 12/1968 | Mail | 210/44 |
| 3,558,255 | 1/1971 | Rose | 210/96 |
| 3,669,883 | 6/1972 | Huckstedt et al. | 210/44 |

Primary Examiner—Charles N. Hart
Assistant Examiner—Robert H. Spitzer
Attorney, Agent, or Firm—George H. Gerstman

[57] ABSTRACT

A compact dissolved air floatation system is provided for very small flow, i.e., less than 20,000 gallons per day. The floatation system includes a vertical floatation column including a release well comprising an inverted, truncated cone with tangential inlet flow to prevent breakage of the bubbles. The floatation column also includes a clarified water outlet at the lower portion thereof, which water outlet comprises a pipe defining openings on its circumference and having a debris trap member fastened to the top of the pipe.

5 Claims, 5 Drawing Figures

DISSOLVED AIR FLOATATION SYSTEM

BACKGROUND OF THE INVENTION

This application is a continuation of my application Ser. No. 286,220, filed Sept. 5, 1972, now abandoned.

This invention relates to a waste treatment system, and more particularly, to a system capable of removing particulate from a liquid mixture, using the dissolved air floatation principle.

In engineering waste disposal problems, many situations are encountered where the wastes are small in volume and contain high amounts of metals and/or emulsified organics. Treatment first requires determining the chemical means to break the emulsions and/or precipitate the metals. Due to the high concentration and nature of the particulates, on many occasions the treated wastes are not amenable to clarification by sedimentation, even with addition of polymeric acids.

Prior art floatation equipment has been found unsatisfactory for small volume wastes. Direct scaledown of large waste treatment systems has been attempted but has not been successful because of its inefficiency.

It is, therefore, an object of the present invention to provide a dissolved air floatation system that can efficiently handle very small flows, i.e., less than 20,000 gallons per day, and more particularly, can efficiently handle flow rates ranging from about 10 gallons per hour to about 800 gallons per hour.

Prior art waste treatment systems generally include floatation cells using horizontal flow. However, horizontal flow requires a relatively voluminous system and is generally inefficient in handling very low flow rates. I have found that it is preferable, in a very small flow system wherein compactness is desired, to use a floatation column having vertical flow. A vertical floatation column is described in an article by Robert D. Grieves and Gregory A. Ettelt, entitled "Continuous, Dissolved-Air Ion Floatation of Hexavalent Chromium," *American Institute of Chemical Engineers Journal*, November, 1967, pages 1167–1171. However, a vertical floatation column is disclosed in the present invention which is different from that disclosed in said article, and is operative to achieve a highly compact and efficient waste treatment system for very small flows.

BRIEF DESCRIPTION OF THE INVENTION

In accordance with the present invention, there is provided a dissolved air floatation system for very small flows. In one embodiment of the invention, the system includes a floatation column having a greater vertical height than width, whereby it is suitable for vertical floatation. An inlet is provided to the floatation column for carrying the combined waste and released bubbles from air-charged water. The floatation column includes a release well comprising an inverted, truncated cone having an open base to permit upward floatation of the combined waste and bubbles. The inlet is coupled to the release well generally tangentially thereof to provide generally tangential flow and thereafter helical flow in the release well, thereby slowing the flow and preventing breakage of the bubbles.

In one embodiment of the invention, a clarified water outlet is provided at the lower portion of the floatation column. The outlet comprises a pipe defining openings on its circumference for passage of clarified water. A debris trap member is provided at the top of the pipe whereby passage of clarified water into the pipe can only be accomplished through the openings. The debris trap member has a substantially greater width than the diameter of the pipe.

In the illustrative embodiment of the invention, the system includes a positive displacement pump for pumping recycled water and an air column for damping the recycled water flow. Means couple the outlet of the positive displacement pump to the inlet of the air column.

A solubilization column is provided, in one embodiment of the invention, for dissolving air bubbles. A recirculation pump forms a circulation route with the solubilization column, for pumping the recycled water in the circulation route to the solubilization column at a greater rate than the normal flow rate of the recycled water. Means are provided for introducing air to the upstream portion of the circulation route prior to introduction of the water in the solubilization column.

A floatation cell is provided with an expansion valve on the downstream side of the solubilization column and on the upstream side of the floatation cell, for releasing the air from the water that has been air-charged, thereby providing tiny air bubbles capable of carrying coagulated waste. The air bubbles and coagulated waste are combined and released in the floatation cell to float to the top thereof, and means are provided for removing the floated materials from the floatation cell.

A more detailed explanation of the invention is provided in the following description and claims, and is illustrated in the accompanying drawings.

DETAILED DESCRIPTION OF THE ILLUSTRATIVE EMBODIMENT

Figure 1:
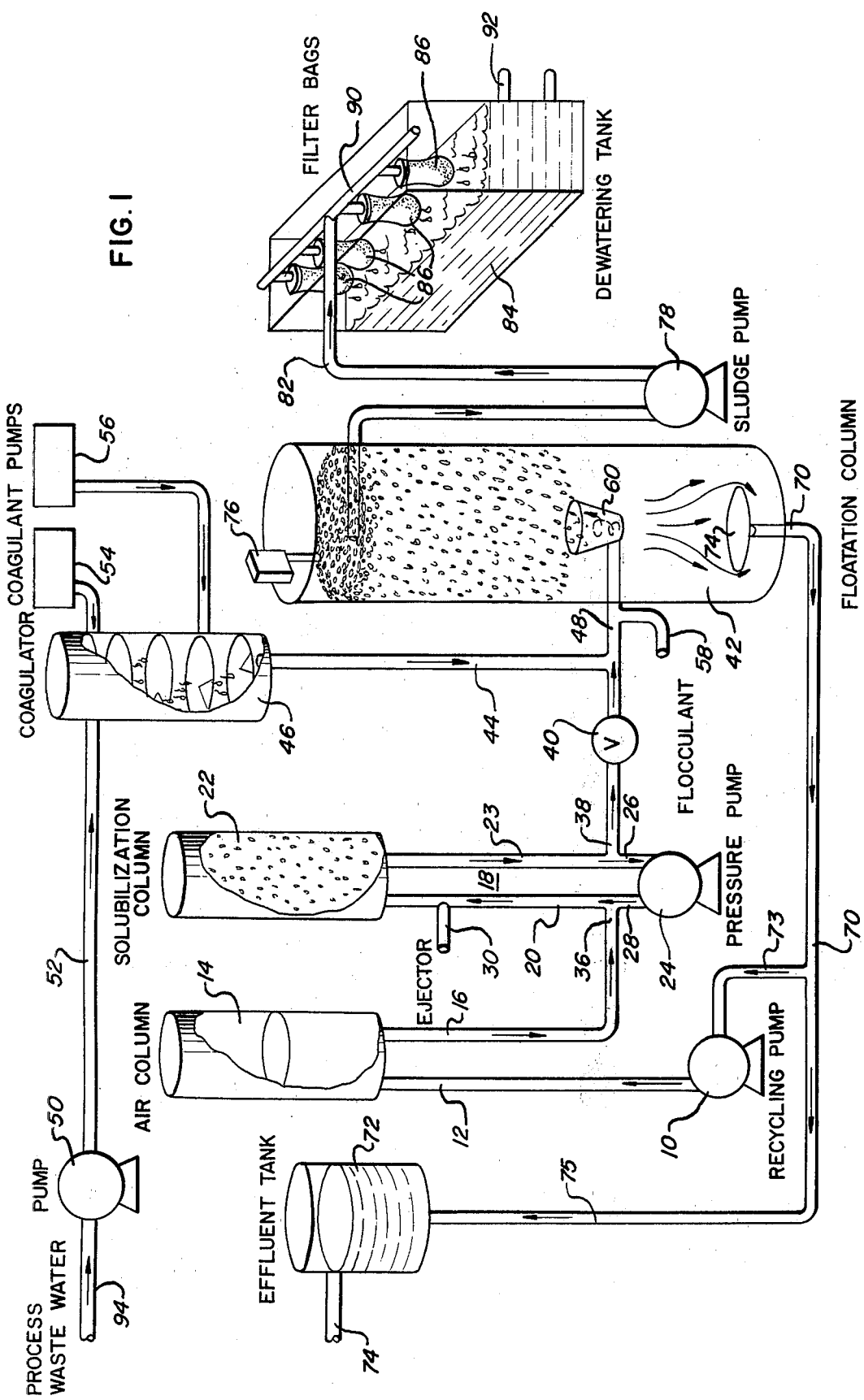
FIG. 1 is a schematic diagram of a dissolved air floatation system in accordance with the principles of the present invention.

Referring to FIG. 1, the waste treatment system of the present invention includes a recycling pump 10 which pumps water through conduit 12 to an air column 14. Recycling pump 10 is a positive displacement pump and thereby has the ability to: (1) operate efficiently with low flow rates, (2) pump at a controlled rate, (3) pump to elevated pressures, and (4) pump a certain degree of solids.

A positive displacement pump, such as recycling pump 10, is intermittent in that when it is in its intake cycle, there is no output and when there is a fluid output, it is not intaking fluid. The intermittent operation of the positive displacement pump is damped by using an air column, which air column is one-half filled with water and one-half with air, and absorbs or dampens the pulses of fluid from the recycling pump, in a manner well-known in the art. While pump 10 is intaking fluid, the water in the air column drops and while pump 10 is pumping out fluid, the water in the air column rises, thereby damping the system so that a substantially continuous flow is seen downstream, where it is necessary to add air to the recycle water.

The recycle from air column 14 is fed via conduit 16 to a circulation route 18. Circulation route 18 comprises conduit 20, solubilization column 22, conduit 23 and pressure pump 24 having inlet 26 and outlet 28 coupled to it.

Figure 2:
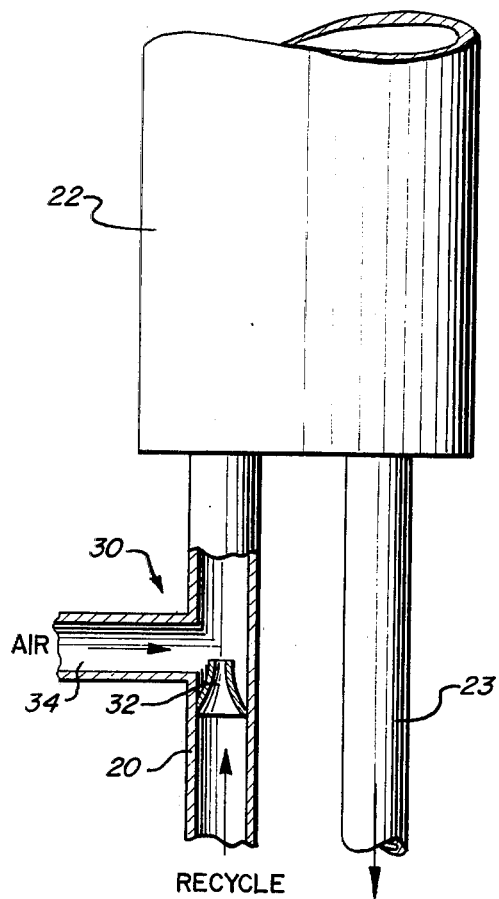
FIG. 2 is a schematic diagram of the ejector portion of the schematic diagram of FIG. 1.

The water from conduit 16 is fed to ejector 30 via conduit 20. Ejector 30 is shown in detail in FIG. 2 where it can be seen that a restrictive nozzle 32 is provided in conduit 20 adjacent to air inlet 34. The recycle thus passes air inlet 34 under high pressure, mixes with air and is filled with air at the ejector. The recycle, which is now filled with air, is fed to solubilization column 22 where the air is dissolved in the water. When the water leaves the solubilization column via conduit 23, the water is now "air-charged."

Although many different types of solubilization columns or means for dissolving air in water are known in the art, an example of a type which has been utilized successfully in connection with the present invention is the solubilization column disclosed in my copending application Ser. No. 69,302, filed Sept. 3, 1970, and assigned to the assignee of the present application.

The normal flow to the ejector and solubilization column, in a system where the present invention is utilized, is too slow for effective operation. Thus it is necessary to speed up the flow by forming circulation route or loop 18 where the recycle is pumped at higher speed. In circulation route 18, the recycle is maintained at a higher volumetric flow rate than the recycle in the inlet 36 to the circulation route and the outlet 38 from the circulation route. To this end, when the waste treatment system is started, circulation route or loop 18 is filled without allowing any of the water to outlet therefrom until the circulation route 18 has the required velocity. If the volumetric flow rate were too slow, there might be clogging because the orifices would have to be extremely small.

An expansion valve 40 is provided at the downstream side of the circulation route 18 and at the upstream side of the floatation column 42. Expansion valve 40 is also upstream of conduit 44 which couples a coagulator 46 to recycle conduit 48. The expansion valve 40 has the dual function of maintaining the average flow rate and also maintaining the pressure desired. This prevents the premature formation of air bubbles. The air bubbles develop, however, immediately after the charged water is released from expansion valve 40 and the bubbles and coagulated waste combine in conduit 48 so that the bubbles attach themselves to the coagulated waste particles and lift the particles up to the top of the floatation column.

It can be seen that to obtain the coagulated waste, processed waste water is pumped by pump 50 and fed by a conduit 52 to coagulator 46. Coagulant pumps 54 and 56 are utilized to add the necessary coagulant to coagulate the emulsified waste water. The coagulator is also designed to permit the addition of acid or alkali for treatment applications requiring pH adjustment or two-stage coagulation.

The air-charged water (carrying air bubbles and coagulated waste) is flocculated by the addition of a flocculant through inlet 58. The flocculated combined waste water and air bubbles enter floatation column 42 via conduit 48 through a release well 60, which is shown in detail in FIGS. 4–5.

Release well 60 is an inverted, truncated cone which operates to slowly release the pinpoint size air bubbles carrying the coagulated materials. In the illustrative embodiment, release well 60 is formed of 16-gauge steel, in the shape of a truncated cone, having an internal diameter at base 62 of 7 inches, an internal diameter at apex 64 of 4 inches and having a vertical height of 5 inches. With respect to FIG. 5, the term "base" is used for the top horizontal line, while the term "apex" is used for the bottom horizontal line, because the truncated cone is inverted.

Figure 4:
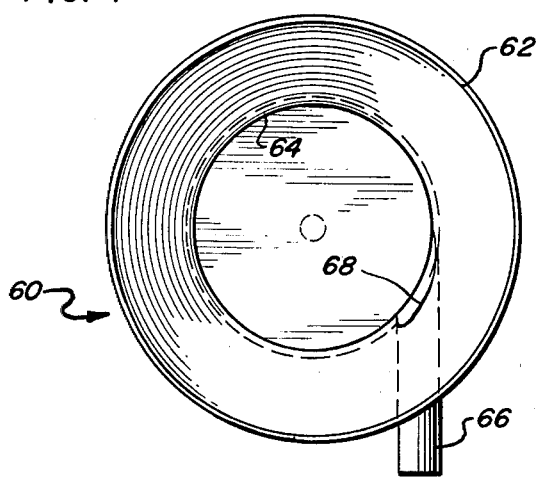
FIG. 4 is a top plan view of a release well used in the system of the present invention.
Figure 5:
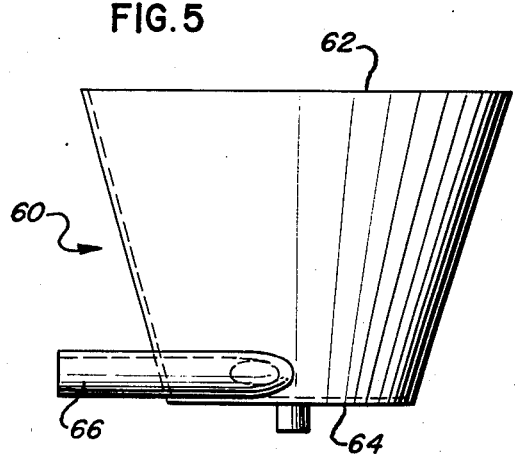
FIG. 5 is a side elevational view thereof.

The inlet pipe 66, which couples conduit 48 to release well 60, is connected at substantially the bottom of release well 60 and tangentially thereto, as shown most clearly in FIG. 4. Thus the flow enters along one side 68 of the release well generally tangentially thereof to provide generally tangential flow and thereafter helical flow in the release well, thereby slowing the entering flow so that there is a minimum of turbulence and thereby preventing breakage of the bubbles.

Figure 3:
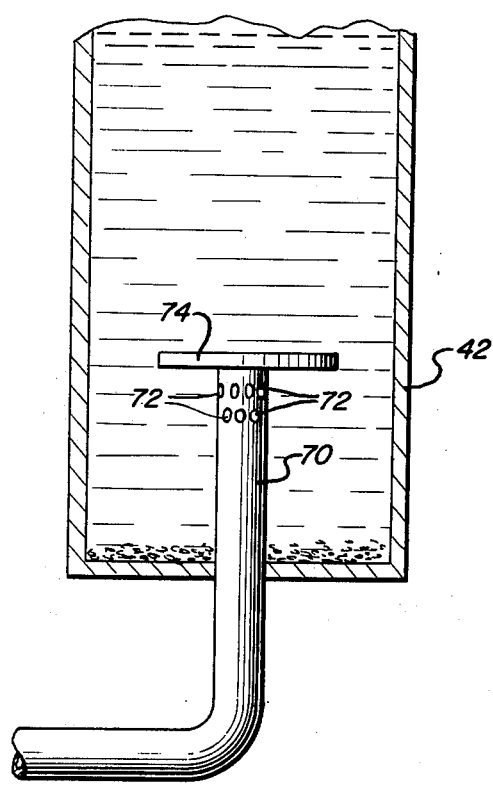
FIG. 3 is a schematic diagram of the debris trap portion of the schematic diagram of FIG. 1.

It is desired that the extraneous debris settle on the bottom of the floatation column. To this end, a clarified water outlet or standpipe 70, is provided at the lower portion of floatation column 42. Outlet 70 is a pipe defining openings 72 on its circumference for passage of clarified water. Openings 72 are shielded by a debris trap 74, in the form of a disc, which is fastened at the top of pipe 70. Debris trap 74 is coaxial with floatation column 42 and the top portion of pipe 70, and has a substantially greater diameter than the diameter of pipe 70. Also, only the upper portion of the pipe defines openings. It is preferred that only the upper one-fifth of the pipe 70 within floatation column 42 define openings for passage of clarified water. In this manner, the debris has to go around the plate and will settle to the bottom of floatation column 42, as shown in FIG. 3, while the water goes through the openings 72. Since the openings are defined all around the circumference of pipe 70, the water will flow all around instead of only on one side of the pipe. Both the effluent and the recycle exit the floatation column via pipe 70.

Pipe 70 is fed both to recycling pump 10 via conduit 73 and an effluent tank 72 via conduit 75. Effluent tank 72 maintains the water level of the floatation column 42. By raising or lowering the outlet 74 of effluent tank 72, it is apparent that the water level of floatation column 42 can be controlled.

A sludge detector 76 is utilized to detect the sludge level and a sludge pump 78, actuable in response to operation of detector 76, is utilized to remove the sludge via conduit 80 and pump the sludge via conduit 82 to dewatering tank 84. Although various types of sludge detectors are known in the art, I prefer to use a sludge detector manufactured by Drexelbrook Engineering Co., Horsham, Penna., referred to as Precision Level Control Model 406-1 which operates with a capacitive probe. As the sludge increases in the water, the dialectric decreases and is sensed by the probe. This actuates the sludge pump 78 and the sludge is drawn out of the floatation column as aforesaid.

In the dewatering tank 84, the floatable wastes are dewatered by filter bags 86. A specific example of the type of filter bag which could be used in connection with the present invention is the GAF Snap-Ring filter bag sold by the Industrial Products Division of GAF Corporation, Greenwich, Conn. It can be seen that the sludge is pumped via conduit 82 to manifold 90 and both the sludge and a liquid such as water (which is fed to manifold 90) is collected and fed through filter bags 86. The filtrate returns to the treatment system via dewatering tank outlet 92 which is coupled to inlet 94 where it mixes with the processed waste water from the main process outlet. It is to be understood that other types of filters may be used, but I have found that the filter bags as described above are very useful with a system for small flow because of their efficiency and inexpensiveness.

A system has been disclosed which is inexpensive to manufacture, is compact in size, and efficiently handles very small flows. Using the present invention, a typical skid-mounted 10,000 gallon per day treatment system may utilize only 50 square feet of floor space and be only 10 feet high. Typical commercial and industrial applications include, but are not limited to, treatment of processed waste waters from:

1. manufacturing operations where cutting and lubricating oils are used;
2. poultry and livestock processing;
3. vehicle washing (railway cars, over-the-road trailers, trucks);
4. latex paint wastes;
5. petrochemical processing;
6. wet scrubbers as used in air pollution control;
7. container washing operations;
8. washing and cleaning operations in food, manufacturing, commercial and institutional laundries; and
9. any other manufacturing or processing system that generates emulsified oil.

Although an illustrative embodiment of the invention has been shown and described, it is to be understood that various modifications and substitutions may be made by those skilled in the art without departing from the novel spirit and scope of the invention. For example, the term "air" as used in the specification and claims herein also refers to other gases. Likewise, the term "water" used herein also refers to other liquids.

What is claimed is:

1. In a dissolved air flotation system, including means for making air charged water and means for combining waste and the air-charged water, the improvement comprising, in combination: a flotation column having a greater vertical height than width whereby it is suitable for vertical flotation; an inlet to said flotation column for carrying the combined waste and released bubbles from said air-charged water; a release well in said flotation column, means coupling said release well to said inlet, said release well permitting upward flotation of the combined waste and bubbles and operating to slow the flow and prevent breakage of the bubbles; a clarified water outlet at the lower portion of said flotation column to draw the clarified water uniformly from about the tank without localized drawoffs and structural obstructions, said outlet comprising a pipe defining openings on its circumference for passage of clarified water; and a plate member that is generally coaxial with said vertical flotation column; means connecting said plate member to the top of said pipe whereby passage of clarified water into said pipe can only be accomplished through said openings, said plate member having a substantially greater diameter than the diameter of said pipe.

2. In a dissolved air flotation system, including means for making air-charged water and means for combining waste and the air-charged water, the improvement comprising, in combination: a flotation column having a greater vertical height than width whereby it is suitable for vertical flotation; an inlet to said flotation column for carrying the combined waste and released bubbles from said air-charged water; a release well in said flotation column, means coupling said release well to said inlet, said release well permitting upward flotation of the combined waste and bubbles and operating to slow the flow and prevent breakage of the bubbles; a clarified water outlet at the lower portion of said flotation column to draw the clarified water uniformly from about the tank without localized drawoffs and structural obstructions, said outlet comprising a pipe for passage of clarified water; a plate member that is generally coaxial with said vertical flotation column; means connecting said plate member to said pipe, said plate member having a substantially greater diameter than the diameter of said pipe; and means for removing the floated materials from said flotation column.

3. In a dissolved air floatation system as described in claim 2, wherein said openings are defined on the circumference of the pipe only above the center of the portion of the pipe within the floatation column.

4. In a dissolved air flotation system, including means for making air charged water and means for combining waste and the air-charged water, the improvement comprising, in combination: a flotation column having a greater vertical height than width whereby it is suitable for vertical flotation; an inlet to said flotation column for carrying the combined waste and released bubbles from said air-charged water; a release well comprising an inverted, truncated cone having an open base to permit upward flotation of the combined waste and bubbles; means coupling said inlet to said release well generally tangentially thereof to provide generally tangential flow and thereafter helical flow in the release well, thereby slowing the flow and preventing breakage of the bubbles; means for removing the floated materials from the vertical flotation column; and further including a clarified water outlet at the lower portion of said flotation column, said outlet comprising a pipe defining openings on its circumference for passage of clarified water and a plate member; means connecting said plate member to the top of said pipe whereby passage of clarified water into said pipe can only be accomplished through said openings, said member having a substantially greater width than the diameter of said pipe.

5. In a dissolved air flotation system, the improvement comprising, in combination: a positive displacement pump for pumping recycled water; an air column for dampening the recycled water flow; means coupling the outlet of said positive displacement pump to the inlet of said air column; means for dissolving air in water; means coupling the outlet of said air column to said air dissolving means; a recirculation pump and conduit forming a circulation route with said air dissolving means at a greater rate than the normal flow rate of the recycled water; means for introducing air to the circulation route upstream of the dissolving means; a flotation cell; an expansion valve on the downstream side of said air dissolving means and on the upstream side of said flotation cell for releasing the air from the water that has been air-charged thereby providing air bubbles capable of carrying coagulated waste; means coupling said air dissolving means and said expansion valve; means for providing coagulated waste; means for combining said released air bubbles with the coagulated waste; means directing the combined bubbles and coagulated waste to said flotation cell whereby said bubbles and waste will float to the top of said flotation cell; means for removing the floated materials from the flotation cell; said flotation cell comprising a flotation column having a greater vertical height than width whereby it is suitable for vertical flotation; a release well comprising an inverted, truncated cone having an open base to permit upward flotation of the combined waste and bubbles; means coupling said inlet to said release well generally tangentially thereof to provide generally tangential flow and thereafter helical flow in the release well, thereby slowing the flow and preventing breakage of the bubbles; and further including a clarified water outlet at the lower portion of said flotation column, said outlet comprising a pipe defining openings on its circumference for passage of clarified water and a plate member; means connecting said plate member to the top of said pipe whereby passage of clarified water into said pipe can be accomplished only through said openings.

* * * * *